May 26, 1959
H. A. STOVER
2,888,624
WIRE SAVING SWITCHING SYSTEM FOR LOAD POSITIONING MOTOR CONTROL
Filed April 16, 1957
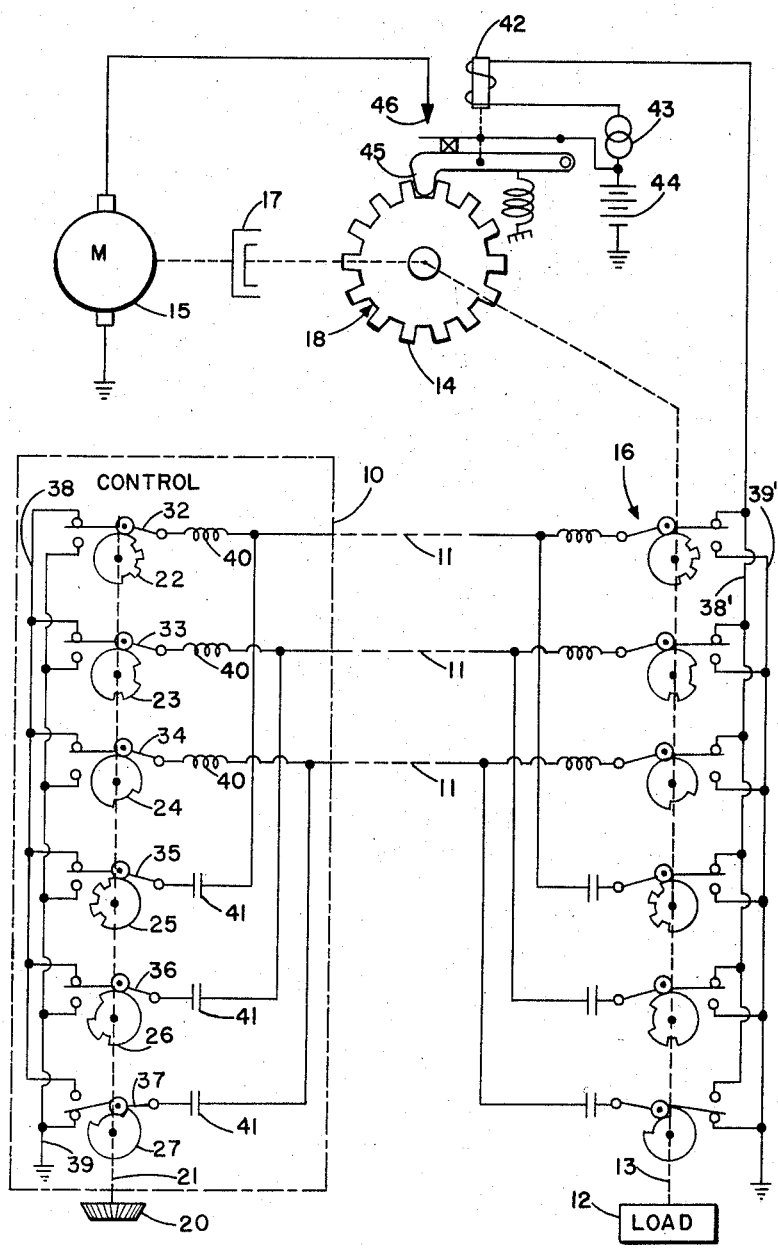
INVENTOR.
HARRIS A. STOVER
BY
ATTORNEYS

2,888,624

WIRE SAVING SWITCHING SYSTEM FOR LOAD POSITIONING MOTOR CONTROL

Harris A. Stover, Cedar Rapids, Iowa, assignor to Collins Radio Company, Cedar Rapids, Iowa, a corporation of Iowa Application April 16, 1957, Serial No. 653,128

7 Claims. (Cl. 318—467)

This invention relates to automatic positioning systems and more particularly to wire saving arrangements of switching systems therefor.

Prior art position indicating systems have utilized $n$ wires to indicate up to a maximum of $(2^n-1)$ positions. Such a system is found in the U.S. Patent No. 2,476,673, issued to R. W. May et al. on July 19, 1949. The prior art systems as exemplified by the May et al. patent have all attempted to provide as much position information as possible over the same or a lesser number of wires. Various methods have been utilized in this respect such as complex cam systems, etc.

It is an object of this invention to provide $m$ times ($m$ an integral number) switch positions for the available number of information lines as prior art systems.

It is an object of this invention to provide a simple, effective system yielding $m(2^n-1)$ bits of information for $n$ wires carrying $m$ characteristic currents.

It is a further object of this invention to provide a position indicating system utilizing simple cams in a control and a controlled station.

It is a feature of the system that direct current and alternating current sources, exemplary of sources of different predetermined frequencies, provide relay switching power, which currents are controlled by suitable reactances at the control and controlled stations.

It is a further feature of this invention that like cam systems are used for both stations and, within each station, for each type of current.

It is thus a feature of the invention that by the use of a multiplicity of $m$ currents of differing nature $(2^n-1)$ positions are transmitted over $n$ wires for each separable type of current yielding $m(2^n-1)$ positions in all.

Further objects, features, and advantages of the invention will become apparent from the following description and claims when read in conjunction with the accompanying drawing in which:

The figure shows the circuit and switch system for an automatic positioning system.

In the figure the control station 10 is segregated from the controlled station by a dashed line box, the remoteness of the control station 10 from the remainder of the system being indicated by $n$ dashed transmission lines 11. Here $n$ is equal to 3.

In the controlled station a mechanical load 12 has its shaft 13 positioned in rotation by a stopwheel 14. Shaft 13 is powered by motor 15 under control of the switching system 16.

In the control station a knob 20 rotates a shaft 21 carrying a sequence of cams 22, 23, 24, and 25, 26, and 27. The first three cams permit switching of the first current relative to the transmission lines 11 in $(2^n-1)$ different permuted combinations in a manner described in the May patent referenced above. Since two distinct currents are being used, the first three cams 22, 23, and 24 have no switching characteristics on one-half of their periphery. Like cams 25, 26, and 27 are utilized to switch the other current used in this illustration of the invention and have selective switching characteristics on one-half of their periphery. These selective characteristics are positioned so as to actuate their related switches during the blank area in which the first three cams are ineffective.

Thus, manual or other rotation of knob 20 will run the control station switch system through all of the possible permuted combinations of transmission lines 11 for only one current and then, following this, through all of the cam set of permutations for only the other current rendering the first current ineffective in describing the position set in.

The cams 22 to 27 actuate single-pole double-throw switches 32, 33, 34, 35, 36, and 37. The up position of each of these switches is connected to a common line 38 which floats, electrically. The down position of all of the switches is connected to a second common line 39 which is grounded. Each of the transmission lines 11 is connected to a pole of the first group, 32, 33, and 34, through an inductance means 40 which rejects the alternating current but transmits the direct current. For the alternating current used, each of the transmission lines 11 is connected to the second set of switch poles through capacitors 41. These capacitors have sufficient susceptance to transmit the alternating current substantially without loss yet not transmit the other, direct current.

Use of a third alternating current of a different frequency is easily made by proper proportioning of the inductances and capacitances 40 and 41 and using an additional impedance means connecting each of the lines with the poles of a third group of switches. The additional impedance rejects the other currents used, yet transmits the desired current to the third set of switches. The third group of switches are alike as to cam sequences and connection as switches 32, 33, and 34, all the cam sequences now being in thirds of the peripheries of the cams. The number of positions indicated by this arrangement is $m(2^n-1)$, with $n$ lines and $m$ separable types of current.

In the controlled station a motor 15 is coupled through a slip clutch 17 to a shaft 13. Shaft 13 carries a stopwheel 14 and drives the load 12. Slip clutch 17 is utilized to limit the load on motor 15 upon actuation of the stop pawl, to prevent harm to the motor. The stopwheel 14 has as many positions or indexing notches 18 as available positions established by the control station 10. Thus, there are $n$ wires in the transmission line 11, $m$ types of current switched, and $m(2^n-1)$ positions established by the switching system. As illustrated there are $2(2^3-1)$ positions and thus fourteen notches in stopwheel 14.

The controlled station has a switch wiring circuit arrayed similarly to that in the control station. The floating common wire 38' is connected to each of the up positions of the switches and the grounded common connection 39' is connected to all of the down positions. One difference, however, is present in that the floating line 38' is connected to a solenoid 42. The electrical circuit through solenoid 42 is completed to ground through an alternating source 43 and a battery 44. Thus, if the switching system connects floating line 38' to ground, a complete circuit through solenoid 42 exists to actuate it. Upon actuation of solenoid 42, stop pawl 45 is lifted out of one of the notches 18 and simultaneously the motor control circuit switch 46 is closed, connecting the motor 15 to the battery 44. The motor energizing switch 46 may be used to connect the motor to some other supply where appropriate to the type of motor used. The motor is here illustrated as a direct current motor for simplicity of illustration.

Solenoid 42 is arranged to respond to all of the frequencies which are used, as here the battery 44 and the alternating source 43. Solenoid 42 may be replaced by a plurality of solenoids arranged mechanically to energize the system as does solenoid 42, wherein each responds to different current or currents from floating wire 38'. This would ameliorate the bandwidth of frequencies to which the single solenoid would have to respond.

In operation, the control knob 20 is adjusted to a desired position. This establishes a sequence of up- and down-positioned switches. As illustrated in the drawing, switch 37 is down and the rest are up. Thus, it is readily apparent that the lowest transmission line is grounded for alternating current but for no other. The remainder of the lines are connected to each other for the respective currents by floating common connection 38. Assuming shaft 13 to be out of position, the corresponding switches in the controlled switch 16 connect floating connection 38' to ground either through the direct connection, as here by switch 37, or by return connection through one of the other switches to floating line 38 back through to grounding line 39'. This ground connection through switch 37 completes the circuit for alternating current source 43 to actuate solenoid 42. Solenoid 42 responds to each of the direct and alternating currents applied to it by this circuit, and so stays energized for all the different permuted combinations of switch 16 which are tested before seeking switch 16 finds that position which corresponds to the control switch position.

Upon actuation of solenoid 42, the stop pawl 45 is lifted out of a notch or stopwheel 14 to permit rotation of shaft 13. As pawl 45 is lifted, the motor operating switch 46 is closed to energize motor 15. Motor 15 then starts and rotates shaft 13, running the cams of the controlled station through their complete cycle of different permuted positions until a position is found which is exactly like that in the control station 10. When this position is found, the floating connection 38' is open-circuited relative to ground, de-energizing solenoid 42.

Upon de-energization of solenoid 42, stop pawl 45 drops into the respective notch to position shaft 13 and load 12 at the indicated position. Simultaneously, the motor is de-energized through the opening of switch 46. Slip clutch 17 relieves to a great extent the stresses involved in suddenly stopping shaft 15 while motor 13 is still turning, under power and then under its momentum.

The seeking switch assembly 16 now has a sequence of positions consonant with those of the control system. Thus, each of the right-hand switches are up except the lowermost one corresponding to the down position of switch 37 in the control box 10. Tracing through these wires one will see that there is no connection from any ground point to the connecting line 38'.

It is to be noted that the cams used in this system have been organized so as to avoid a position which if reached by the seeking switch 16 leaves the control box unable to establish connection to the floating connecting line 38' to energize the relay or solenoid 42.

It is also to be noted that numerous cam arrangements may be used, but that shown illustrates the principle the best. Thus each of the cams covers twice as many combinations as the one prior to it. That is, cam 22 is alternately up and down for each position possible. The next immediate cam 23 is up every two and down every two positions and the cam following 24 is up four positions and down correspondingly.

Although this invention has been described with respect to particular embodiments thereof, it is not to be so limited because changes and modifications may be made therein which are within the full intended scope of the invention as defined by the appended claims. It is to be noted further that the term "predetermined frequency" is intended to include direct current as a special case thereof.

I claim:

1. An automatic shaft positioning arrangement comprising a control station, a controlled station, each of said stations having a plurality of switching means, a plurality of connecting lines interconnecting the switching means of each station, impedances of different responses connected to said switching means at both stations, means to position all the switching means of the control station in different permuted combinations, means connecting said controlled station as a seeking switch station including electrical motor means to position the switching means of the controlled station seeking switch system in different permuted combinations, and circuit means for energizing said motor means, said circuit means being maintained closed until the permuted setting of the switching means of both stations bear a predetermined relationship, the relation between the number of positions of said control unit and the number of said interconnecting lines being $m(2^n-1)$ where $n$ is the number of said interconnecting lines, and $m$ is the integer number of different responses of said impedances.

2. A seeking switch control system comprising a control station having a first plurality of $n$ switches actuated in a permuted combination of positions, a second plurality of $n$ switches actuated in a like permuted combination, said first and second plurality of switches being positioned in sequence; $n$ transmission lines, $n$ impedance means coupling each of said transmission lines to corresponding units of said first plurality of switches, a second plurality of $n$ impedance means coupling each of said transmission lines to corresponding units of said second plurality of switches, each of said two pluralities of impedances transferring currents which the other blocks, a controlled seeking switch station, said seeking switch system being arrayed similarly to said control station, motor means, means interconnecting said seeking switch system and said motor means such that said motor is energized to run said seeking switch through $2(2^n-1)$ successive permutations until said seeking switch is arrayed similarly to said control station, said last-named means being responsive to currents passed by either of said pluralities of impedances.

3. An automatic positioning system comprising a controlled station, said station having a shaft to be positioned, a plurality of seeking switches coupled to said shaft, a plurality of $m$ current sources, said sources being of different predetermined frequencies, a control station, a plurality of $n$ lines interconnecting said stations, a plurality of $m$ groups of switches, each group of switches having $n$ switches, each of said switches in each plurality selectively connecting each of said lines to ground or to a common line, impedance means between each switch and each line, the impedance means in each group of switches being similar and transferring only one of the $m$ currents, said plurality of seeking switches having a corresponding conformation, means positioning all control station switches in $m(2^n-1)$ different permuted combinations, and means actuating said seeking switches through all their different permuted combinations until said seeking switches are arrayed like said control station switches.

4. An automatic shaft positioning apparatus comprising a control station, a controlled station, said controlled station having $m$ current sources of predetermined frequencies, said stations being interconnected by a plurality of $n$ lines, a first plurality of switches arrayed in $m$ groups of $n$ switches at said control station, like impedance means coupling each switch of a group to a line, each group impedance means conducting current of one of said predetermined frequencies while rejecting all other currents, means selectively positioning said first plurality of switches in $m(2^n-1)$ different permuted combinations, a second plurality of switches at said controlled station arranged like said first plurality of switches, motor means for positioning said second plurality of switches in a like number of different permuted combinations, and circuit means connecting said current sources through said second plurality of switches to said motor means whereby said second plurality of switches is positioned like said first plurality of switches.

5. A position indicating system comprising a control station, a controlled station, a transmission link between said station having a predetermined plurality of circuits, said circuits adapted to handle a predetermined number of currents of different predetermined frequencies, first groups of predetermined pluralities of switches, said first groups being at said control station, said first groups having different permuted combinations of state, corresponding groups of predetermined pluralities of switches, said corresponding groups being at said controlled station, like impedance means coupling each switch of a group to a line, the impedance means in each group rejecting all but a selected predetermined frequency, and means establishing said corresponding groups in a seeking switch arrangement wherein said controlled station indicates the different permuted combinations of state of said control station.

6. In a shaft positioning system a remote control station having therein groups of switches, each switch connecting a movable contact to either of two fixed contacts, all of the first of said fixed contacts being connected together to a common line, all of the second of said fixed contacts being grounded, a transmission medium having a plurality of circuits, each movable contact of a switch in a group being connected through a like impedance means to a respective transmission circuit, the impedance means of different groups conducting currents having one of different predetermined frequencies and rejecting all others, means positioning said switches to connect said movable contacts to either of said two fixed contacts in different permuted combinations, a controlled station having therein groups of switches arrayed similarly to said control station switches, means for positioning said controlled station switches in different permuted combinations in response to the grounding of the controlled station common line for any of said group currents whereby $m$ group currents over a plurality of $n$ circuits indicate $m(2^n-1)$ positions of said control station positioning means.

7. A shaft positioning control system comprising a shaft to be positioned, motor means for positioning said shaft, stop means mounted on said shaft for locking it in a desired position, pawl means engaging said stop means, means for lifting said pawl means from said stop means and energizing said motor including a solenoid, a source of direct current, a source of alternating current, said solenoid being responsive to both said currents, switch means closing a circuit of said current sources and said solenoid, said switch means comprising a plurality of switches controlled by said shaft, a like plurality of switches at a remote station, one-half of said remote and said controlled switches being interconnected by an equal number of transmission lines, said halves being connected through inductors in each line, the other halves of said remote and said controlled switches being connected respectively to said transmission lines through capacitors in each line, said remote and said controlled switches connecting said lines either to a common line or to ground, said controlled switches common line being connected to said solenoid, whereby said shaft is positioned in $2(2^n-1)$ different positions, where $n$ is the number of transmission lines.

References Cited in the file of this patent

UNITED STATES PATENTS

| | | |
|---|---|---|
| 1,952,368 | Gardner | Mar. 27, 1934 |
| 2,423,077 | Vriendt et al. | July 1, 1947 |
| 2,476,673 | May et al. | July 19, 1949 |